US005642356A

United States Patent [19]
Wenk

[11] Patent Number: 5,642,356
[45] Date of Patent: Jun. 24, 1997

[54] OPTIMAL PAGING OF ONE OR TWO CELLULAR MOBILE STATIONS USING A HARD PAGE SLOT

[75] Inventor: Richard D. Wenk, San Diego, Calif.

[73] Assignee: Hughes Electronics, Los Angeles, Calif.

[21] Appl. No.: 394,091

[22] Filed: Feb. 24, 1995

[51] Int. Cl.$^6$ .................................................. H04J 3/16
[52] U.S. Cl. ........................... 370/337; 370/904; 370/469; 455/33.1; 379/59
[58] Field of Search .................................. 370/85.7, 95.1, 370/95.3, 110.1, 94.1, 94.2, 95.2, 84; 379/58, 63, 59, 60, 61, 62; 455/33.1, 33.2, 33.4, 38.2, 53.1, 54.1, 54.2, 56.1, 68, 70, 88, 33.3, 67.7; 340/925.44, 311.1

[56] References Cited

U.S. PATENT DOCUMENTS 5,404,355  4/1995  Raith ......................... 370/95.1
5,485,505  1/1996  Noeman et al. ............. 379/91

*Primary Examiner*—Dang Ton
*Attorney, Agent, or Firm*—John T. Whelan; Wanda Denson-Low

[57] ABSTRACT

In an improved system and method for paging cellular mobile stations, an incoming call signal intended for a paged cellular mobile station is received into a base station. Next, a page frame is assembled having a header that identifies the page frame as a hard page frame containing a prescribed number of mobile station identification numbers. The page frame contains an associated mobile station identification number associated with the paged cellular mobile station, and a dummy mobile station identification number. The page frame is transmitted to, and is disassembled within the paged cellular mobile station. The associated mobile station identification number is recognized within, the paged cellular mobile station, and, within each of a plurality of cellular mobile stations, the dummy mobile station identification number is ignored.

26 Claims, 6 Drawing Sheets

OPTIMAL PAGING OF ONE OR TWO CELLULAR MOBILE STATIONS USING A HARD PAGE SLOT

BACKGROUND OF THE INVENTION

The present invention relates to bandwidth optimization and efficient processor utilization in a cellular telephone system, and more particularly to bandwidth optimization and efficient processor utilization in remote or mobile station paging in a cellular telephone system.

Interim Standard (IS) 136 (promulgated by the Telecommunications Industry Association) adds a Digital Control Channel (DCCH) to IS-54B, an 800 MHz TDMA Cellular Standard. The fundamental unit of measure in the digital control channel is a slot. Slots are logically combined (in groups of 16 for a half-rate DCCH and 32 for a full-rate DCCH) to form "Superframes".

Like the Japanese and European digital cellular standards, IS-136, which in early 1995 will replace IS54B as the new North American standard for 800 MHz dual mode TDMA cellular telephony, was specified as a "layered" standard. The theory behind layering standards is discussed in detail in the CCITT (Blue Book) Recommendation X.200. The following paragraphs give a brief introduction to the philosophy behind the layering used in the IS-136 standard.

At the highest layer of control in the air interface, complex state machines (e.g., Call Control, Mobility Management) are reacting to external events and incoming message traffic by generating outgoing "Messages" (an Origination Message, for example) according to the IS-136 standard. On example of such layering is depicted in FIG. 1. Since state machines that exist in the mobile station and the base station are complimentary, the depiction in FIG. 1 is representative of the protocol machine implemented in either side of the air interface (i.e., cellular communications channel).

Messages generated by "layer 3" (as depicted in FIG. 1) state machine processing are sent to "layer 2" for segmentization into one or more "Frames". Since many messages can not fit entirely into a single Frame, these Messages must be spread over several Frames according to rules specified for layer 2 processing in IS-136. There are several types of layer 2 Frames, and the type used depends upon the layer 3 Message being framed.

Frames produced by layer 2 are passed to a "layer 1" (or physical layer) for insertion into Slots, encoding, interleaving, modulation, and ultimately transmission over the air. Each type of Frame is designed to fit exactly into a single Slot. Therefore, there is no further decomposition of the layer 3 Message.

The decomposition process associated with sending a Message is symmetric with the process of recomposition a Message that is received. In addition, these protocols are considered "peer-to-peer", meaning that there is an implied connection between the layer 2 at the mobile station and the layer 2 at the base station, and a similar implied connection between their layer 1's and layer 3's. Thus, a Frame assembled by the layer 2 in the mobile station is disassembled by the layer 2 in the base station, and each is theoretically unaware of the means by which the Frame was carried between them, i.e., their respective layer 1's.

When a base station receives notification (from the mobile telephone switching office (MTSO)) of an incoming call, it must locate the mobile station in order to notify the mobile station of the incoming call. To do this, the base station sends a Page Message over any digital control channel (DCCH) that the mobile station may be monitoring, which generally includes DCCH's within several cells. If the mobile station responds to the Page Message with a Page Response, the base station is notified that the mobile station has been successfully located. The base station responds to the Page Response by proceeding with the rest of call setup, as specified in IS-136.

The mobile unit, however, is not always monitoring the digital control channel (DCCH) for Page Messages. Each Slot in a given digital control channel has a specified function (in accordance with IS-136). Some, called broadcast control channel (BCCH) slots, are allocated to carry overhead information to all mobile stations that may be monitoring a particular digital control channel (point-to-many). Others, called Short Message Service, Paging, and Access Response Channel (SPACH) slots, are used by the base station to carry point-to-point Messages to a specific mobile station. Together the BCCH and the SPACH (as possibly some Reserved slots) comprise a Superframe. Each Superframe is made up of a total of thirty-two slots (in a full-rate DCCH), each allocated as a BCCH slot or a SPACH slot (or possibly a Reserved slot). Superframes are transmitted in pairs referred to as Primary and Secondary Superframes, respectively. In a quiescent system, the mobile station is only required to monitor a single SPACH slot (called its Paging Channel (PCH) Subchannel) in every other Superframe, i.e., in every Primary Superframe. During the period between occurrences of its PCH Subchannel, the mobile station may shut off its Transmitter, Receiver, and possibly even some of its processors. This "shut off" state, is referred to herein as a "sleep mode," and accounts for a significant reduction in power consumption by the mobile unit, which results in increased battery life in battery powered mobile units.

In mature, i.e., highly utilized, IS-136 systems, many mobile stations are assigned to the same PCH Subchannel, and there are (potentially frequent) occasions where more than one of the mobile stations assigned to a given PCH Subchannel will have to be simultaneously paged by the base station.

Heretofore, there have been several techniques employed for sending pages to more than one mobile station in a single PCH Subchannel on a given digital control channel. One technique is to construct a layer 3 Page Message including up to four 34-bit Mobile Identification Numbers (MIN) in the Page Message. This technique, however, involves layer 3 processing at both the mobile station and the base station (which necessarily implies high processor utilization), and more than one layer 2 Frame may be required to send the message, (which implies more than one layer 1 SPACH slot is required). This technique therefore does not efficiently utilize processing resources or bandwidth.

A second technique for paging more than one mobile station in a single PCH Subchannel slot has been to use a "Hard Page", which is a special type of layer 2 Frame that carries three, four or five different mobile station addresses, but no layer 3 Message information. This serves to not only reduce layer 3 involvement, thereby reducing processing overhead, but is also more bandwidth efficient, because a Hard Page Frame fits into a single PCH Subchannel slot. Thus, of the techniques available to the base station for paging more than one mobile station in a slot, the most efficient are "Hard Pages". Because Hard Pages carry only address information for the mobile stations being paged and because "Hard Pages" consume only a single slot, they are very efficient from both a bandwidth and a processing standpoint.

Unfortunately however, Hard Pages are designed to carry exactly three 34-bit Mobile Identification Numbers (MIN) for the purposes of paging exactly 3 mobile stations, to carry four 24-bit Temporary Mobile Station Identifiers (TMSIs) to page exactly four mobile stations, or to carry four or five 20-bit TMSIs to page exactly four or five mobile stations, respectively.

It is possible, however, that only one or two mobile stations must be paged in a single slot, thereby precluding the use of a Hard Page. When paging a single mobile station using a 34-bit MIN, the base station can format a Page Message (not a Hard Page) and still use only a single slot. However, the mobile station must decode the Page Message, because it is a layer 3 message, in order to ascertain that it is a page. This is less efficient than the processing required for a Hard Page, which is done almost completely at layer 2. When paging two mobile stations using 34-bit MINs, an entire Page Message does not fit into a single slot. Therefore, in addition to bearing the overhead of processing a layer 3 Page Message, two slots are consumed in order to page two mobile stations, thereby consuming additional bandwidth.

SUMMARY OF THE INVENTION

The present invention advantageously provides a system and method for improved processing efficiency and bandwidth optimization in the paging of cellular mobile units in a cellular telephone system.

The invention, in one embodiment, can be characterized as a method of improved bandwidth utilization. In practice, an incoming call signal intended for a paged cellular mobile station is received into a base station, from a mobile telephone switching office. The base station defines a cell, and the paged cellular mobile station is one of a plurality of mobile stations located within the cell. Next, the method includes assembling a page frame having a header that identifies the page frame as a hard page frame, e.g., a triple hard page, containing a prescribed number of mobile station identification numbers, e.g., three. The page frame contains a first of the prescribed number of mobile station identification numbers, and a second of the prescribed number of mobile station identification numbers. The first of the prescribed number of mobile station identification numbers is an associated mobile station identification number associated with the paged cellular mobile station, and the second is a dummy mobile station identification number.

The page frame is transmitted to the paged cellular mobile station, and is disassembled within the paged cellular mobile station. The associated mobile station identification number is next recognized within the paged cellular mobile station as being associated with the paged cellular mobile station. Within each of the plurality of cellular mobile stations, the dummy mobile station identification number is ignored.

As a result of the above method, using a hard page including at least one dummy mobile station identification number, processing overhead is reduced within the first cellular mobile station and within the base station. In addition, bandwidth is more efficiently utilized, because the hard page takes only one page frame, e.g., SPACH slot, as opposed possibly to more than one page frame used by a Page Message.

In another embodiment, the invention can be characterized as a method for use in a cellular telephone system with a multi-layer processing structure. The cellular telephone system has a base station with a first base station layer, a second base station layer and a third base station layer, wherein, in accordance with this embodiment, page messages are assembled by the second base station layer and transmitted by the first base station layer such that processing by the third base station layer is reduced. The method involves signaling the second base station layer, using the third base station layer, to page a paged cellular mobile station, and, within the second base station layer, assembling a page frame having a header that identifies the page frame as a hard page, e.g., a hard triple page, containing a prescribed number of mobile station identification numbers, e.g., three. The page frame is also made up of a first of the prescribed number of mobile station identification numbers, and a second of the prescribed number of mobile identification numbers. The first of the prescribed number of mobile station identification numbers is a first associated mobile station identification number associated with the paged cellular mobile station, and the second is a dummy mobile station identification number. The page frame, having been assembled, is passed to the first base station layer where it is transmitted to the paged cellular mobile station. In the paged cellular mobile station, the page frame is disassembled and the first associated mobile station identification number is recognized as being associated with the paged cellular mobile station.

This embodiment is able to achieve improved bandwidth utilization by paging less than the prescribed number of mobile stations using a hard page designed to page the prescribed number of mobile stations. Such is achieved by using one or more dummy mobile station identification numbers to fill out the hard page with the prescribed number of mobile station identification numbers. Furthermore, because the third base station layer (which generally requires greater processing resources than the first or second base station layers in such multi-layer processing environments) has minimal involvement in the paging of the paged cellular mobile station, improved processing efficiency is achieved.

It is therefore a feature of the invention to optimize processing resources within a cellular system by reducing the processing overhead required to carry out paging.

It is another feature of the invention to improve efficiency in bandwidth utilization by reducing the number of TDMA slots needed to communicate pages.

It is a further feature of the invention to provide for both optimized utilization of processing resources and for improved bandwidth efficiency by using a hard page, e.g., a hard triple page, to page less than a maximum number of cellular mobile station pageable by such hard page.

It is an additional feature of the invention to page less than a maximum number of cellular mobile stations by transmitting a dummy mobile station identification as a part of a hard page.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
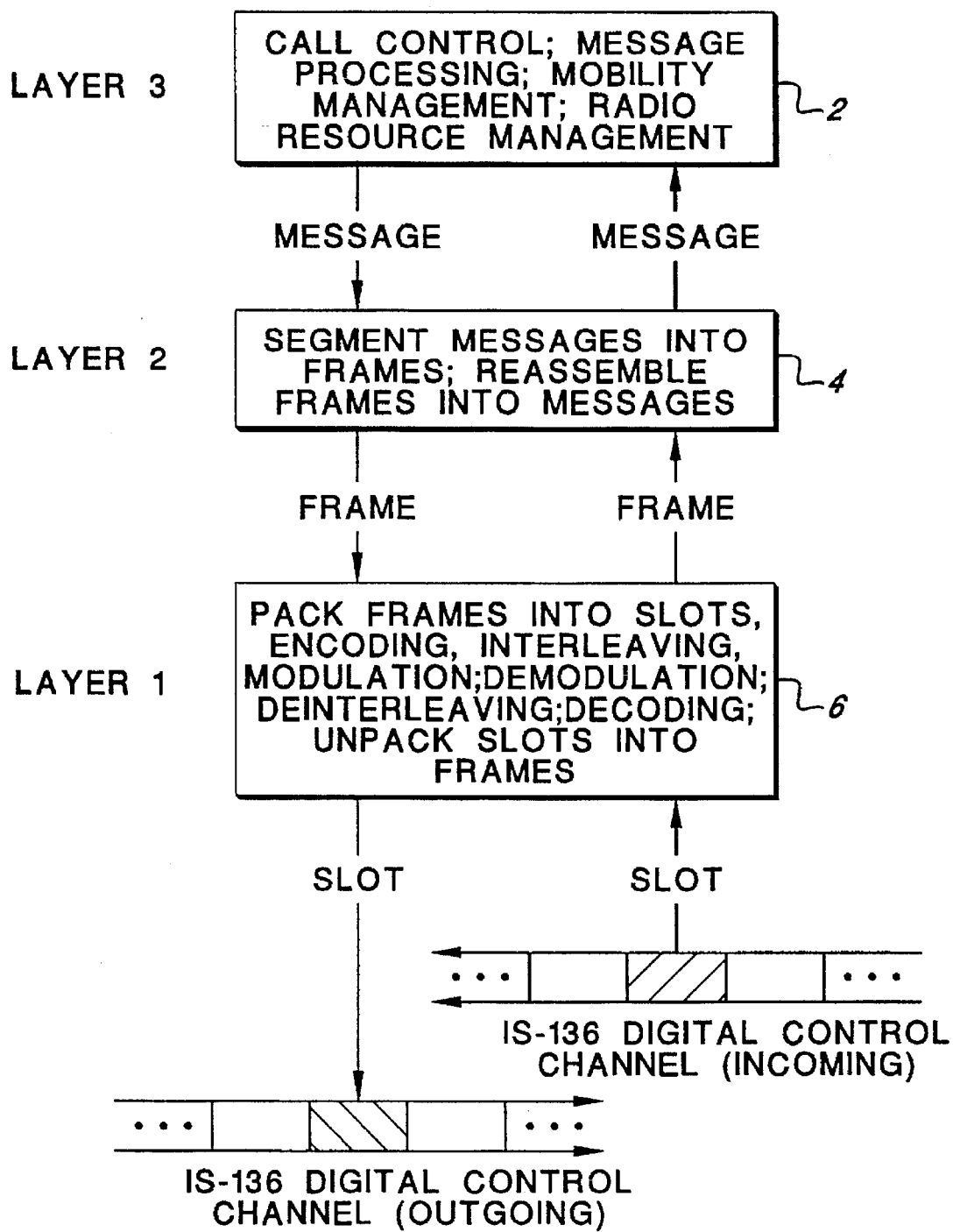
FIG. 1 is a block diagram representing functional layers in a cellular transceiver, either a base station or a mobile unit, such as can be used to implement one embodiment of the invention

Referring to FIG. 1, a block diagram is shown of functional layers in a cellular transceiver, either a base station or a mobile unit. "Layer 3" is responsible for message processing, call control, mobility management, and radio resource management. Outgoing messages generated by layer 3 are passed to "layer 2" for further processing at layer 2, and incoming Messages are passed from layer 2 to layer 3.

Layer 2 is responsible for segmenting Messages into Frames, and for reassembling Frames into Messages. When an outgoing Message is received into layer 2 from layer 3 it is segmented in layer 2 into outgoing Frames. The outgoing Frames are passed from layer 2 to "layer 1." Similarly, incoming Frames are passed from layer 1 to layer 2, where they are reassembled into Messages and passed to layer 3.

A physical layer, referred to as layer 1, packs the outgoing Frames into outgoing Slots, and encodes, interleaves and modulates the slots onto a carrier for transmission through the digital control channel (DCCH) portion of a communications channel. Layer 1 also demodulates incoming slots, and decodes, deinterleaves, and unpacks the incoming slots.

Figure 2:
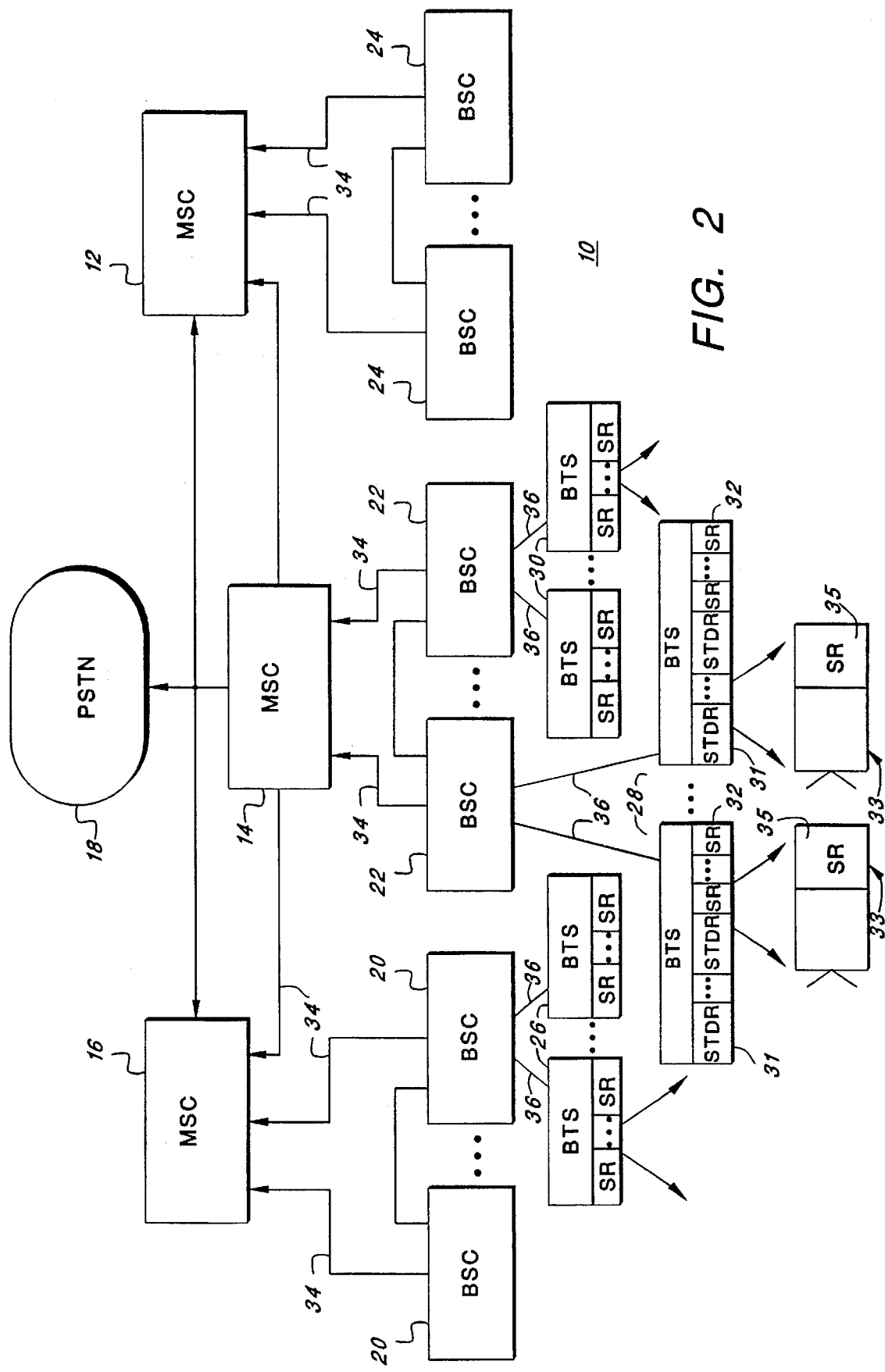
FIG. 2 is a block diagram of a cellular communications system suitable for implementing one embodiment of the present invention.

Referring to FIG. 2, a block diagram is shown of a cellular communications system suitable for implementing one embodiment of the present invention. A cellular telephone system 10 has a plurality of mobile switching centers (MSC) 12, 14, 16, or mobile telephone switching offices (MTSO), that are connected to each other and to a public switched telephone network (PSTN) 18. Each of the mobile switching centers is connected to a respective group of base station controllers (BSC) 20, 22, 24. Each base station controller is connected to a group of individual base transceiver stations (BTS) 26, 28, 30. Each base transceiver station of the groups 26, 28, 30 defines an individual cell of the cellular telephone system.

Each base transceiver station of the groups 26, 28, 30 includes hardware and software functions required to communicate over communications channels of the system 10; and includes transmitters and receivers for communication with mobile telephone units. Each base transceiver station also includes a plurality of individual standard receivers (StdR) 31 and scanning receivers (SR) 32 (for scanning selected portions of the communications channel). Each base transceiver station further includes digital multiplex equipment for transmission of audio traffic to its associated base station controller. It is the base transceiver stations, along with their associated base station controllers and mobile switching centers, that function using the functional layers described in FIG. 1 to serve as the "base station", as described herein.

A plurality of digital mobile telephone units 33 are used with the system 10 for communication over the communications channel (or radio frequency traffic channel) with a particular base transceiver station of a particular cell in which the particular base transceiver station is located. Associated with each digital mobile unit 33 is a scanning receiver 35 for scanning selected portions of the communications channel between the mobile unit 33 and the base transceiver station of serving and neighboring cells.

Each base station controller of the groups 20, 22, 24 implements audio compression/decompression and handles call establishment, disconnect, and handoff procedures, and allocates system resources between the individual base transceiver stations associated with each of the base station controllers 20, 22, 24. More specifically, each base station controller performs handoff execution for transferring on-going communications from one cell to another within the group of base transceiver stations connected to the particular base station controller. Each base station controller communicates with its associated mobile switching center for effecting a handoff involving a cell or base transceiver station associated with a different base station controller. Each mobile switching center 12, 14, 16 processes all requests for calls, switching functions, as well as the mobility functions of registration, authentication and handoff.

Figure 3:
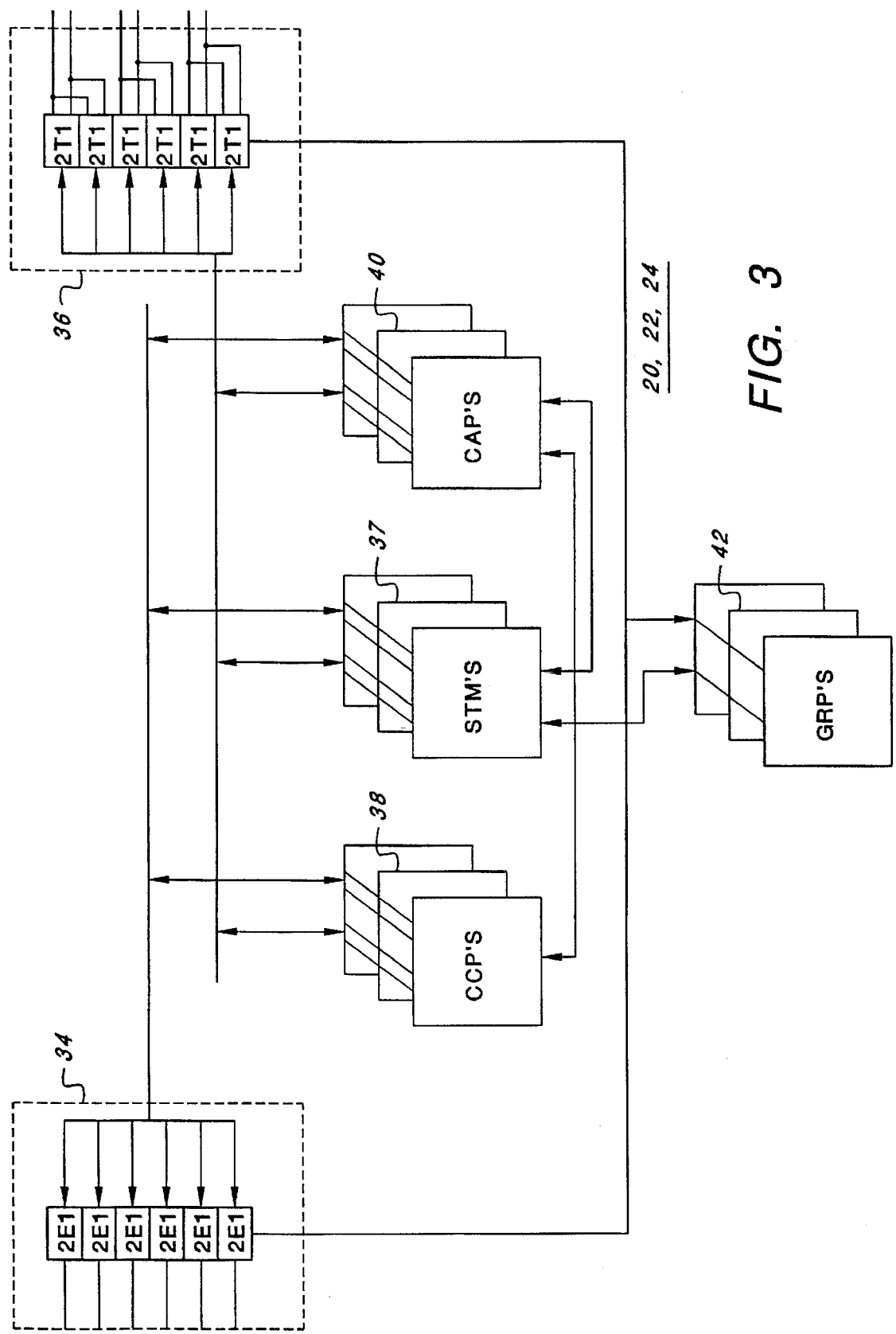
FIG. 3 is a block diagram of a base station controller as shown in FIG. 2.

Referring next to FIG. 3, a detailed block diagram is shown of an exemplary base station controller 20, 22, 24, representative of the base station controllers 20, 22, 24 in FIG. 2. (As will be understood by one skilled in the art, a similar block diagram representation can be made of the mobile units of the present embodiment). The base station controller 20, 22, 24 includes trunk interfaces 34 to its associated mobile switching center and trunk interfaces 36 to its associated base transceiver stations. Also, each base station controller includes a switching and transcoding module (STM) 37, and is made up of three types of control processors implemented in identical hardware modules 38, 40, 42.

A first of the hardware modules is a call control processor (CCP) 38. In addition to switching of pulse code modulation (PCM) traffic between the trunks 34, 36 for analog traffic, it terminates call protocol for mobile switching. It also performs connection control and mobility management for handoff execution. For digital configurations (in accordance with, e.g., IS-136) there can be more than one call control processor for each base station controller. When there is more than one call control processor per base station controller, calls are distributed among call control processors based upon load. The number of call control processors needed depends upon load and redundancy requirements.

A second of the hardware modules is a channel access processor (CAP) 40, and is required for digital configurations, as described herein, and performs voice channel allocations and deallocations. The channel access processor 40 also forwards power and time alignment measurements to the call control processors 38.

A third of the hardware modules is a global resource processor (GRP) 42 that distributes calls among the call control processors 38 based on load; and communicates with other base station controllers for scanning receiver measurements, i.e., the global resource processor 42 communicates with another base station controller to exchange messages relating to scanning receiver (SR) measurements.

Figure 4:
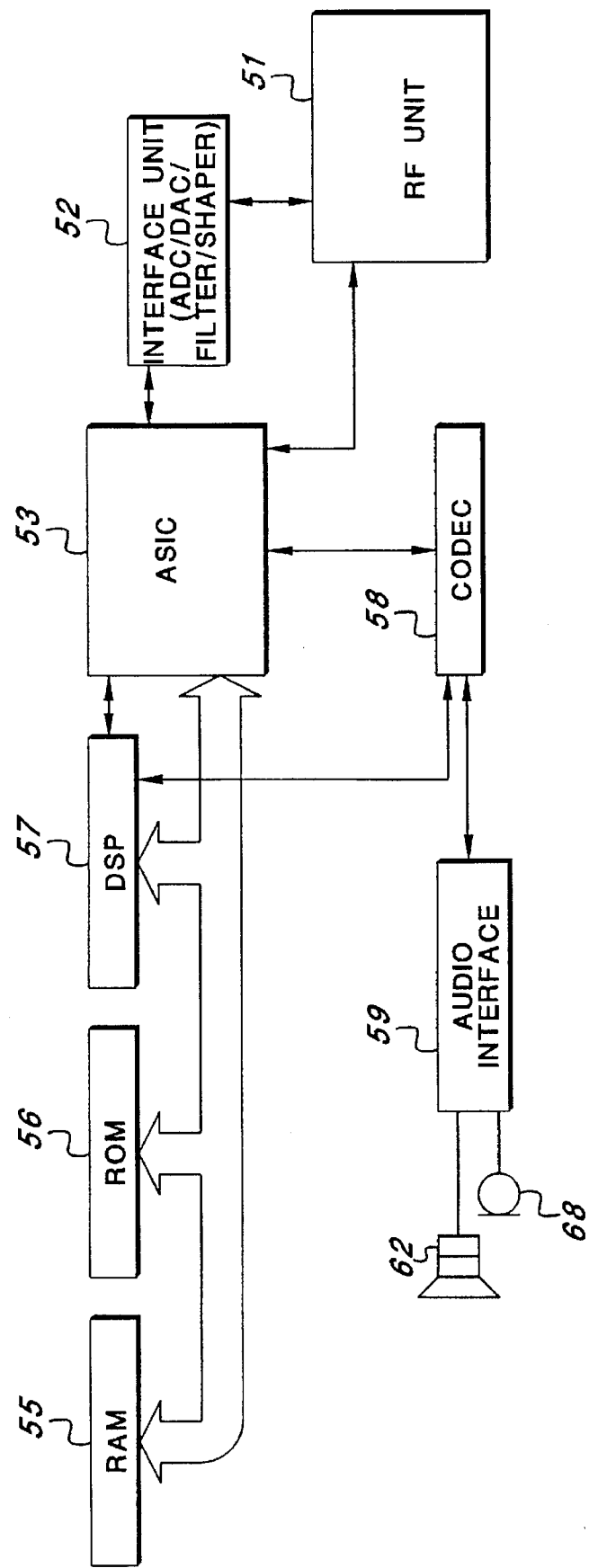
FIG. 4 is a block diagram of a cellular mobile unit with which one embodiment of the present invention can be utilized.

Referring to FIG. 4, a block diagram is shown of an exemplary cellular mobile unit, in which the teachings of the present invention can be utilized. A radio frequency (RF) unit 51 is shown coupled to an interface unit 52, which is in turn coupled to an application specific integrated circuit (ASIC) 53. The RF unit 51 can also be directly coupled to the application specific integrated circuit 53. A digital signal processor (DSP) 57 is coupled through a data bus 54 to a random access memory (RAM) 55, a read only memory (ROM) 56, and the application specific integrated circuit 53. The application specific integrated circuit 53 is also coupled to coder-decoders (CODECs) 58, which are coupled through an audio interface 59 to a microphone 68 and a speaker 62.

The RF unit 51 of the cellular mobile unit of FIG. 1 performs conventional radio frequency communications, as are known in the art. The interface unit 52 performs digital to analog conversions, analog to digital conversions, filtering and wave shaping, as dictated by the RF unit 51 and the application specific integrated circuit 53. The application specific integrated circuit 53 is used to implement an FM frequency shift keying (FSK) receiver, an FM message processor, transmit and receive timing generators, interfaces to the CODECs 58, buffering of received samples, fade detection circuitry, FEC encoding and decoding, a fixed point divider unit (for VSELP), a phase lock loop (for generation of a CODEC clock), miscellaneous input/output circuitry, and glue logic for processor interfaces.

The digital signal processor (DSP) 57 is utilized within the cellular transceiver to perform the following functions: π/4 DQPSK modulation/demodulation, VSELP analysis/synthesis, hands-free voice switching, demodulation/equalization, FM audio transmission/reception, FM SAT detection and generation, FM FSK transmission, FM message handling/call processing, digital call processing/control, user interface, monitor/diagnostic/testing, SACCH encoding/decoding/queuing, authentication and key generation, signaling privacy, voice recognition, and voice response. The read only memory (ROM) 56 is used for storage of control software as well as RAM-based overlay code. The read only memory 56 may include an electronically erasable programmable read only memory (EEPROM) (not shown) that can be used for storage of ESN/user information and factory calibration settings. The random access memory (RAM) 56 is used for data storage and program memory overlays. The coder/decoders (CODECs) 58 are used for modulation and wave shaping of transmitted and received signals, as is known in the art. The audio interface 59 includes a linear coder/decoder for voice samples and other interfaces such as filters and multiplexers for interfacing to the microphone 62 and speaker 68.

Figure 5:
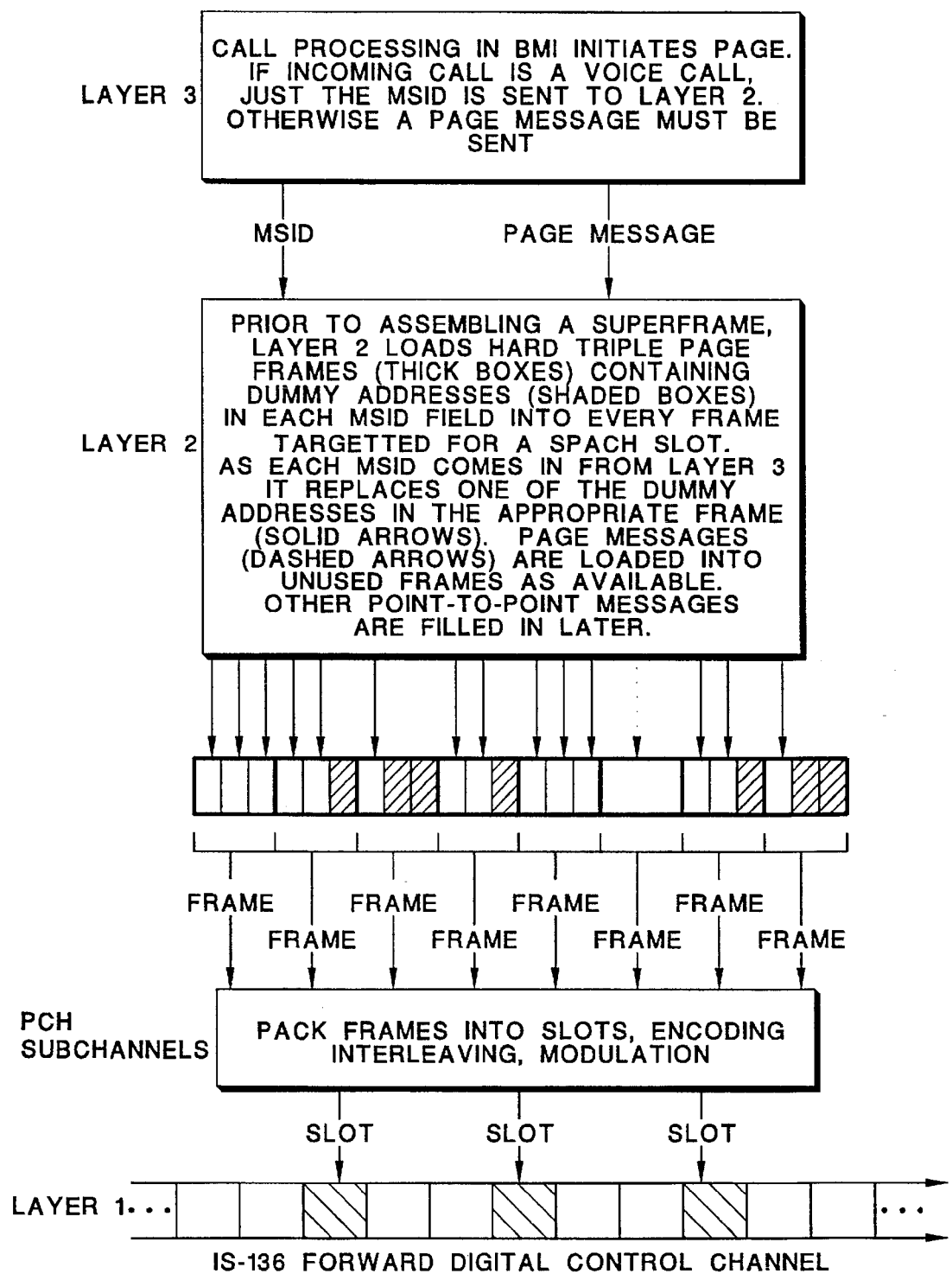
FIG. 5 is block diagram illustrating the functions carried out at each of the functional layer depicted in FIG. 1 in order to carry out one embodiment of the invention.

Referring next to FIG. 5, a block diagram is shown illustrating the functions carried out at each of the above-mentioned functional layers within the base station (FIGS. 2 and 3) in order to carry out the functions of the present embodiment. Analogous functions are carried out within the mobile unit (FIG. 4).

In accordance with the present embodiment, incoming calls received from the mobile telephone switching office (MTSO) 12, 14, 16 (FIG. 2) are received into the base station controller and are initially processed at layer 3. In response to the incoming call, layer 3 initiates a page. The type of page initiated, however, depends of the type of incoming call that is received. If the incoming call is a non-voice call, a layer 3 page message must be used, in accordance with IS-136, to page the mobile unit (or mobile station) to which the incoming call is directed. If the incoming call is a voice call, however, a hard triple page is used, in accordance with the present embodiment, to initiate paging of the mobile unit. A hard quadruple page or hard penta page may also be used in accordance with other embodiments of the invention.

In practice the mobile station identification numbers (MSID) for all incoming voice calls are passed from the mobile telephone switching office (MTSO) 16 to the base station controller (and base transceiver system). Within the base station (i.e., the base station controller and base transceiver system), the mobile station identification number is passed through layer 3 to layer 2. Advantageously, there is no layer 3 message processing of the mobile station identification number when the incoming call is a voice call, thereby reducing or eliminating the higher processing overhead associated with the creation of a layer 3 page message. Within layer 2, hard triple page frames, initially containing three dummy mobile station identification numbers, e.g., all zeros, are loaded into each SPACH Frame. As a mobile station identification number is received into layer 2 from layer 3, it is directed by layer 2 to the appropriate PCH Subchannel, within the SPACH, where it replaces one of the dummy mobile station identification numbers. In the event there are fewer than three, but at least one, mobile station identification numbers directed to a particular PCH Subchannel, the dummy mobile station identification numbers within the hard triple page that are not replaced, remain in the hard triple page. If there are more than three mobile station identification numbers that should be directed to a PCH Subchannel, those mobile station identification numbers in excess of three are redirected to another PCH Subchannel.

Once all incoming mobile station numbers have been directed to their respective PCH Subchannels (or to alternative PCH Subchannels in the event more than three mobile station identification numbers should be directed to a particular PCH Subchannel), layer 2 replaces any hard triple pages still containing three dummy mobile identification numbers with page messages, e.g., non-voice layer 3 page messages, or other point-to-point messages. The SPACH Frame is then passed from layer 2 to layer 1, where each SPACH Frame is packed into a slot, and is encoded, interleaved and modulated. The SPACH slot, along with the remainder of its Superframe, is then transmitted over the air to the cellular mobile units within range of the base station. Many of the layer 1 functions described herein are carried out by the base transceiver system, described above.

The above-described process is reversed at the mobile unit. However, the mobile unit typically monitors only one PCH Subchannel, i.e., one SPACH slot, in a SPACH in every other Superframe, and goes into "sleep" mode inbetween monitored PCH Subchannels.

In any case, layer 1 demodulates, deinterleaves, decodes and unpacks the received SPACH slot. The PCH Subchannel (or SPACH slot) is passed to layer 2, where a determination is made as to whether the PCH subchannel contains a layer 3 Message. In the event the PCH Subchannel does not contain a layer 3 Message, the PCH Subchannel is processed at layer 2. For example, in the event the PCH Subchannel contains a hard triple page, the three mobile station identification numbers within the hard triple page are unpacked and evaluated by layer 2. In the event one or more of the three mobile station identification numbers is a dummy mobile station identification number, e.g., all zeros, it is discarded (ignored) by layer 2. Note that any unused mobile station identification number may be designated as the "dummy" mobile station identification number—all zeros is mentioned here only by way of example. In event the mobile station identification number is not a dummy mobile station identification number, e.g., anything other than all zeros, it is passed to layer 3 where it is compared to the mobile station identification number of the particular mobile unit. In the event that one of the non-dummy mobile station identification numbers passed to layer 3 matches the mobile station identification number for the particular mobile unit, layer 3 will respond with a Page Response, as is known in the art. Otherwise, layer 3 will ignore the non-dummy mobile station identification numbers.

In this way, fewer than, e.g., three mobile stations are paged using a hard page designed to page exactly three mobile stations, thereby saving on processing overhead and bandwidth.

Figure 6:
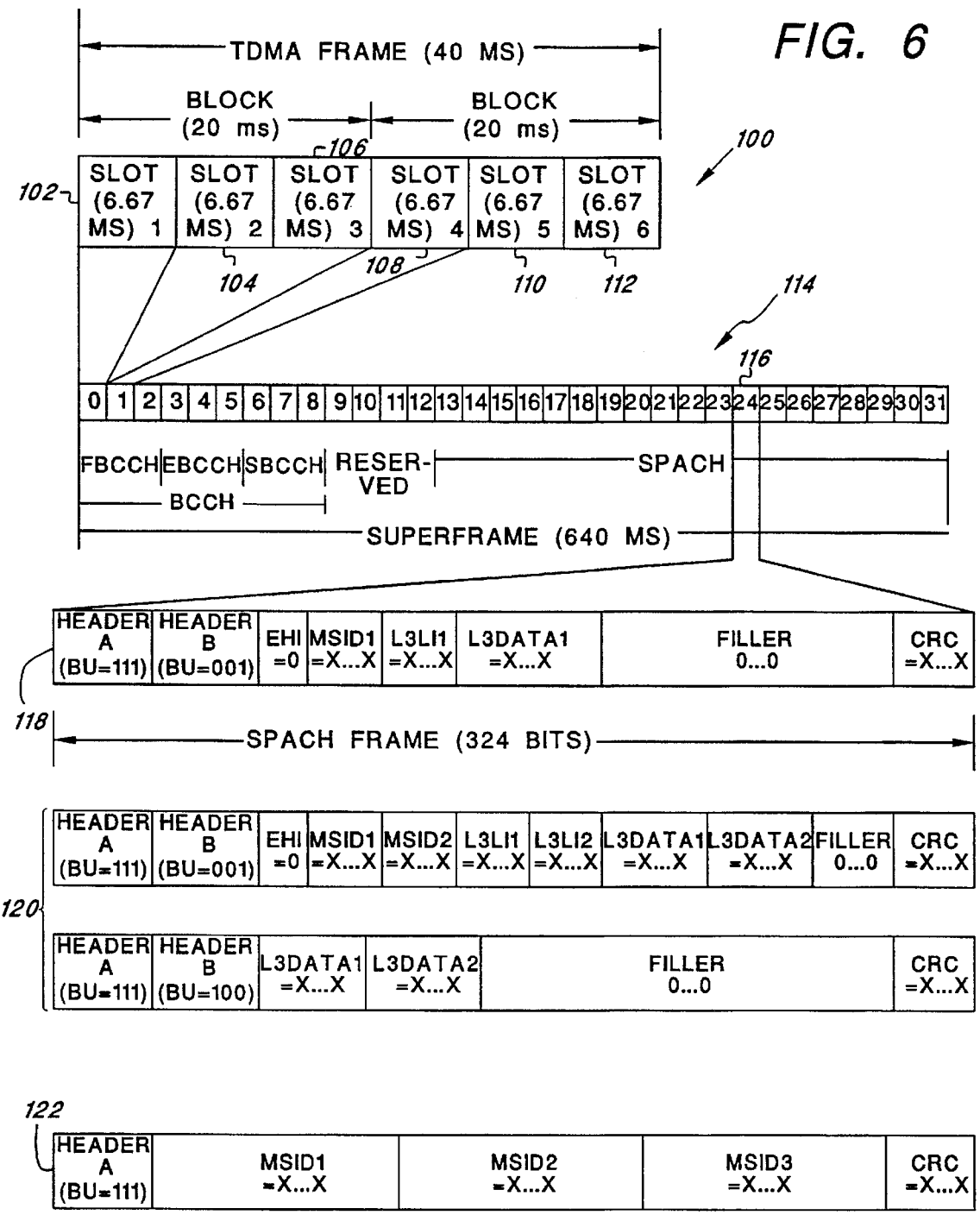
FIG. 6 is a block diagram showing the various elements in a time division multiple access digital control channel, and specifically the elements of a single and double page message, and the elements of a hard triple page.

Referring next to FIG. 6, a block diagram is shown of the various elements in a time division multiple access digital control channel, and specifically the elements of a single and double page message, and the elements of a hard triple page.

A TDMA Frame 100 is depicted made up of six Slots 102, 104, 106, 108, 110, 112. Each Slot 102, 104, 106, 108, 110, 112 is transmitted through the communications channel, consisting primarily of air, during a 6.67 mS period of time, such that the TDMA Frame 100 is 40 mS in duration. In accordance with current TDMA conventions, a TDMA Channel is made up of every third slot within the TDMA Frame. Thus, Slots 1 and 4 (102, 108) are a part of one TDMA channel, Slots 2 and 5 (104, 110) part of another TDMA channel, and Slots 3 and 6 (106, 112) yet another.

Within each TDMA channel, groups of 32 slots comprise a Superframe 114, having a duration of 640 mS. A total of three Superframes, one per TDMA channel, are transmitted every 640 mS. Within each Superframe 114, a portion of the slots are designated the Broadcast Channel (BCCH), another portion Reserved, and another portion Short Message Service, Paging, and Access Response Channel (SPACH). Each mobile unit monitoring a particular base station is assigned to monitor a particular PCH Subchannel, i.e., a particular slot within the SPACH.

As an example, slot 24 (116) may be the monitored PCH Subchannel for a particular group of mobile units within a cell (assuming for a given case it is part of the SPACH). The PCH Subchannel may contain any of a plurality of point-to-point communications encoded in 324 bits, which make up the PCH Subchannel. As a first example, the PCH Subchannel may contain a single page message 118. The single page message 118 is a level 3 message, i.e., not a hard page message, and therefore requires additional processing at level 3. The single page message 118 begins with header information indicating that it is single page message, followed by one mobile-station identification number, a level 3 length indicator and level 3 data field.

Another example of a type of message that may be contained in the PCH Subchannel is also depicted in FIG. 4: a double page message 120. The double page message 120 begins with header information that indicates that it is a double page message, followed by two Mobile Station Identification Numbers, two Level 3 Length Indicators, and two Level 3 Data Fields. Unfortunately, the double page message 120 requires two PCH Subchannels (or slots), and therefore requires additional bandwidth. In addition, the double page message 120 is a level 3 message, and therefore requires additional processing overhead.

A further example of a type of message that may be contained in the PCH Subchannel is a hard triple page 122. The hard triple page 122 is advantageously processed at layer 2, thereby reducing processing overhead, and further requires only a single PCH Subchannel, thereby optimizing bandwidth utilization. The hard triple page 122 begins with header information indicating that it is a Hard Triple Page, followed by three mobile station identification numbers. As described above, the present embodiment advantageously provides for the paging of one or two mobile units using a hard triple page 122, thereby minimizing processor utilization and maximizing bandwidth efficiency over heretofore known methods for paging one or two mobile stations using a single page message 118 or a double page message 120. As described above, such is achieved by packing the hard triple page 122 with dummy mobile station identification numbers to the extent that fewer that three mobile units are to be paged in a given PCH Subchannel.

While the invention herein disclosed has been described by means of specific embodiments and applications thereof, numerous modifications and variations could be made thereto by those skilled in the art without departing from the scope of the invention set forth in the claims. One example of a variation to the above-described embodiment uses a hard quadruple page or a hard penta page in lieu of the hard triple page described above.

What is claimed is:

1. In a cellular telephone system, a method of cellular mobile station paging comprising:

receiving into a base station a first incoming call signal for a first cellular mobile station, the base station defining a cell within which the first cellular mobile station is located, the first cellular mobile station being one of a plurality of cellular mobile stations located within the cell;

assembling a page frame comprising a header that identifies the page frame as a triple hard page frame, a first associated mobile station identification number associated with the first cellular mobile station and a first dummy mobile station identification number; and transmitting the page frame to the first cellular mobile station.

2. The method of claim 1, including;

disassembling said page frame within said first cellular mobile station;

recognizing, within said first cellular mobile station, said first associated mobile station identification number as being associated with said first cellular mobile station; and ignoring, within each of said plurality of cellular mobile stations, said first dummy mobile station identification number.

3. The method of claim 2 further comprising:

initiating a first cellular voice call in response to said recognizing, within said first cellular mobile station, of said first mobile station identification number as being associated with said first cellular mobile station.

4. The method of claim 1 wherein said transmitting of said page frame to said first cellular mobile station includes transmitting said page frame at a time within a frame of a digital control channel, the time within the frame being associated with the first cellular mobile station.

5. The method of claim 4 including:

receiving into said base station a second incoming call signal for a second cellular mobile station, the second cellular mobile station being another of said plurality of cellular mobile stations within said cell, said time within said frame of said digital control channel also being associated with the second cellular mobile station;

said assembling including assembling said page frame comprising said header that identifies said page frame as a triple hard page frame, said first associated mobile station identification number, a second associated mobile station identification number associated with the second cellular mobile station, and said first dummy mobile station identification number; and said transmitting including transmitting said page frame to the second cellular mobile station.

6. The method of claim 5 including;

disassembling said page frame within said first cellular mobile station;

recognizing, within said first cellular mobile station, said first associated mobile station identification number as being associated with said first cellular mobile station;

disassembling said page frame within said second cellular mobile station;

recognizing, within said second cellular mobile station, said second mobile station identification number as being associated with said second cellular mobile station; and ignoring, within each of said plurality of cellular mobile stations, said first dummy mobile station identification number.

7. The method of claim 1 further comprising:

said assembling including assembling said page frame comprising said header that identifies said page frame as a triple hard page frame, said first associated mobile station identification number, said first dummy mobile station identification number, and a second dummy mobile station identification number.

8. The method of claim 7 including:

ignoring, within each of said plurality of cellular mobile stations, said first and second dummy mobile station identification numbers.

9. In a cellular telephone system with a multi-layer processing structure having a base station with a first base station layer, a second base station layer and a third base station layer, a method of efficient processor utilization wherein page messages are assembled by the second base station layer and transmitted by the first base station layer such that minimal processing by the third base station layer is needed, the method comprising:

signaling, using the third base station layer, the second base station layer to page a first cellular mobile station;

assembling, using the second layer, a page frame comprising a header that identifies the page frame as a triple hard page frame, a first associated mobile station identification number associated with the first cellular mobile station and a first dummy mobile station identification number;

passing the page frame, having been assembled, to the first base station layer; and transmitting, using the first base station layer, the page frame to the first cellular mobile station.

10. The method of claim 9 including:

disassembling said page frame within said first cellular mobile station; and recognizing, within said first cellular mobile station, said first mobile station identification number as being associated with said first cellular mobile station.

11. The method of claim 9 including:

signaling, using said third base station layer, said second base station layer to page a second cellular mobile station;

said assembling, using said second base station layer, including assembling said page frame comprising a header that identifies said page frame as a triple hard page frame, a first associated mobile station identification number associated with said first cellular mobile station, a second associated mobile station identification number associated with the second cellular mobile station, and said first dummy mobile station identification number;

said transmitting, using said first base station layer, including transmitting said page frame to the second cellular mobile station.

12. The method of claim 11 including:

disassembling said page frame within said first cellular mobile station;

recognizing, within said first cellular mobile station, said first mobile station identification number as being associated with said first cellular mobile station;

disassembling said page frame within said second cellular mobile station; and recognizing, within said second cellular mobile station, said second mobile station identification number as being associated with said second cellular mobile station.

13. The method of claim 9 further comprising:

said assembling, using said second base station layer, including assembling said page frame comprising said header that identifies said page frame as a triple hard page frame, said first associated mobile station identification number, said first dummy mobile station identification number, and a second dummy mobile station identification number.

14. In a cellular telephone system, a method of improved bandwidth utilization comprising:

receiving into a base station a first incoming call signal for a first cellular mobile station, the base station defining a cell within which the first cellular mobile station is located, the first cellular mobile station being one of a plurality of cellular mobile stations within the cell;

assembling a page frame comprising a header that identifies the page frame as a hard page frame for containing a prescribed number of mobile station identification numbers, a first of the prescribed number of mobile station identification numbers that is a first associated mobile station identification number associated with the first cellular mobile station, and a second of the prescribed number of mobile identification numbers that is a first dummy mobile station identification number; and transmitting the page frame to the first cellular mobile station.

15. The method of claim 14 including:

disassembling the page frame within said first cellular mobile station;

recognizing, within said first cellular mobile station, said first associated mobile station identification number as being associated with said first cellular mobile station; and ignoring, within each of said plurality of cellular mobile stations, said first dummy mobile station identification number.

16. The method of claim 14 wherein said transmitting of said page frame to said first cellular mobile station includes transmitting said page frame at a time within a frame of a digital control channel, the time within the frame being associated with the first cellular mobile station.

17. The method of claim 16 including:

receiving into said base station a second incoming call signal for a second cellular mobile station, the second cellular mobile station being another of said plurality of cellular mobile stations within said cell, the time within the frame also being associated with the second cellular mobile station;

said assembling including assembling said page frame comprising said header that identifies said page frame as a hard page frame, said first of said plurality of said mobile identification numbers, said second of said plurality of said mobile identification number, and a third of said plurality of said mobile identification numbers that is a second associated mobile station identification number associated with the second cellular mobile station; and said transmitting including transmitting said page frame to said first cellular mobile station, and to the second cellular mobile station.

18. The method of claim 17 including:

disassembling the page frame within said first cellular mobile station;

recognizing, within said first cellular mobile station, said first associated mobile station identification number as being associated with said first cellular mobile station;

disassembling said page frame within said second cellular mobile station;

recognizing, within said second cellular mobile station, said second mobile station identification number as being associated with said second cellular mobile station; and ignoring, within each of said plurality of cellular mobile stations, said first dummy mobile station identification number.

19. The method of claim 14 further comprising:

said assembling including assembling said page frame comprising said header that identifies said page frame as a hard page frame, said first of said plurality of said mobile identification numbers, said second of said plurality of said mobile identification number, and a third of said plurality of said mobile identification numbers that is a second dummy mobile station identification number.

20. In a cellular telephone system with a multi-layer processing structure having a base station with a first base station layer, a second base station layer and a third base station layer, a method of efficient processor utilization wherein page messages are assembled by the second base station layer and transmitted by the first base station layer such that minimal processing by the third base station layer is needed, the method comprising:

signaling, using the third base station layer, the second base station layer to page a first cellular mobile station;

assembling, using the second base station layer, a page frame comprising a header that identifies the page frame as a hard page frame for containing a prescribed number of mobile station identification numbers, a first of the prescribed number of mobile station identification numbers that is a first associated mobile station identification number associated with the first cellular mobile station, and a second of the prescribed number of mobile identification numbers that is a first dummy mobile station identification number;

passing the page frame, having been assembled, to the first base station layer; and transmitting, using the first base station layer, the page frame to the first cellular mobile station.

21. In a cellular telephone system, a method of cellular mobile station paging comprising:

receiving a page frame into a first cellular mobile station, a base station defining a cell within which the first cellular mobile station is located, the first cellular mobile station being one of a plurality of cellular mobile stations located within the cell;

disassembling the page frame, within the first cellular mobile station, the page frame comprising a header that identifies the page frame as a triple hard page frame, a first associated mobile station identification number associated with the first cellular mobile station and a first dummy mobile station identification number;

recognizing, within the first cellular mobile station, the first associated mobile station identification number as being associated with the first cellular mobile station; and ignoring, within each of said plurality of cellular mobile stations, said first dummy mobile station identification number.

22. The method of claim 21 including:

receiving said page frame into a second cellular mobile station;

disassembling said page frame, within the second cellular mobile station, the page frame comprising the header, the first associated mobile station identification number, a second associated mobile station identification number associated with the second cellular mobile station and the first dummy mobile station identification number; and recognizing, within the second cellular mobile station, the second associated mobile station identification number as being associated with the second cellular mobile station.

23. The method of claim 21, including:

ignoring, within each of said plurality of cellular mobile stations, a second dummy mobile station identification number, the page frame comprising the header, the first associated mobile station identification number, the first dummy mobile station identification number, and the second dummy mobile station identification number.

24. In a cellular telephone system, a method of improved bandwidth utilization comprising:

receiving a page frame into a first cellular mobile station, a base-station defining a cell within which the first cellular mobile station is located, the first cellular mobile station being one of a plurality of cellular mobile stations located within the cell;

disassembling the page frame, the page frame comprising a header that identifies the page frame as a hard page frame for containing a prescribed number of mobile station identification numbers, a first associated mobile station identification number associated with the first cellular mobile station, and a second of the prescribed number of mobile station identification numbers that is a first dummy mobile station identification number;

recognizing, within the first cellular mobile station, the first associated mobile station identification number as being associated with the first cellular mobile station; and ignoring, within each of said plurality of cellular mobile stations, said first dummy mobile station identification number.

25. The method of claim 24 including:

receiving said page frame into a second cellular mobile station;

disassembling said page frame, within the second cellular mobile station, the page frame comprising the header, the first associated mobile station identification number, the first dummy mobile station identification number and a third of the prescribed number of mobile station identification numbers that is a second associated mobile station identification number associated with the second cellular mobile station; and recognizing, within the second cellular mobile station, the second associated mobile station identification number as being associated with the second cellular mobile station.

26. The method of claim 24 including:

ignoring, within each of said plurality of cellular mobile stations, a second dummy mobile station identification number, said page frame comprising the header, said first associated mobile station identification number, said first dummy mobile station identification number and a second of said prescribed number of mobile station identification numbers that is the second dummy mobile station identification number.

* * * * *